(12) United States Patent
Xiao et al.

(10) Patent No.: US 11,466,877 B2
(45) Date of Patent: Oct. 11, 2022

(54) AIR PURIFICATION PIECE AND AIR PURIFICATION MODULE

(71) Applicant: Tsinghua University, Beijing (CN)

(72) Inventors: Ru Xiao, Beijing (CN); Jinhan Mo, Beijing (CN); Yinping Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 281 days.

(21) Appl. No.: 16/642,019

(22) PCT Filed: Sep. 22, 2017

(86) PCT No.: PCT/CN2017/103018
§ 371 (c)(1),
(2) Date: Feb. 25, 2020

(87) PCT Pub. No.: WO2019/056323
PCT Pub. Date: Mar. 28, 2019

(65) Prior Publication Data
US 2020/0182496 A1    Jun. 11, 2020

(51) Int. Cl.
*F24F 8/10*    (2021.01)
*F24F 13/20*    (2006.01)
*F24F 13/28*    (2006.01)
*F24F 110/50*    (2018.01)
*F24F 11/89*    (2018.01)
(Continued)

(52) U.S. Cl.
CPC ............... *F24F 8/10* (2021.01); *F24F 13/28* (2013.01); *F24F 8/108* (2021.01); *F24F 8/158* (2021.01); *F24F 8/167* (2021.01); *F24F 11/30* (2018.01); *F24F 11/89* (2018.01); *F24F 2013/205* (2013.01); *F24F 2110/50* (2018.01)

(58) Field of Classification Search
CPC .. B01D 53/00; B01D 53/34; F24F 8/10; F24F 13/28; F24F 8/167; F24F 2110/50; F24F 2110/64; F24F 2110/65; F24F 2110/66
USPC ....... 55/485, 486, 490; 95/288; 96/126, 422; 171/173, 177; 422/122
See application file for complete search history.

(56) References Cited

U.S. PATENT DOCUMENTS 3,789,582 A * 2/1974 Graybill ................. F02M 35/02
96/139
4,707,167 A * 11/1987 Saito .................... B01D 46/523
55/385.2
(Continued)

FOREIGN PATENT DOCUMENTS

CN    200975751    11/2007
CN    101444634    6/2009
(Continued)

OTHER PUBLICATIONS

WIPO, ISR for PCT/CN2017/103018, dated Jun. 6, 2018.

*Primary Examiner* — Minh Chau T Pham
(74) *Attorney, Agent, or Firm* — Hodgson Russ LLP (57) ABSTRACT

An air purification piece and an air purification module including same. The air purification piece includes a substrate piece and a purification coating (4), which is provided on the outer surface of the substrate piece; the substrate piece comprises a first support piece (11), a second support piece (12) and a heating component (2), which is provided between the first support piece (11) and the second support piece (12).

15 Claims, 3 Drawing Sheets

(51) Int. Cl.
*F24F 11/30* (2018.01)
*F24F 8/108* (2021.01)
*F24F 8/158* (2021.01)
*F24F 8/167* (2021.01)

(56) References Cited

U.S. PATENT DOCUMENTS

| | | | | |
|---|---|---|---|---|
| 6,146,436 | A * | 11/2000 | Hollingsworth | B01D 39/163 210/491 |
| 6,280,691 | B1 * | 8/2001 | Homeyer | B01D 53/885 55/482.1 |
| 6,585,788 | B2 * | 7/2003 | Sugano | F01N 3/0226 55/282.3 |
| 10,168,059 | B2 * | 1/2019 | Yamaguchi | B01D 46/0032 |
| 2007/0220856 | A1 * | 9/2007 | Cho | B01D 39/2041 55/525 |
| 2012/0137876 | A1 * | 6/2012 | Miller | B01D 46/10 95/23 |
| 2014/0230382 | A1 * | 8/2014 | Fuh | B01D 45/08 55/327 |
| 2016/0091190 | A1 * | 3/2016 | Huang | H05K 1/0209 362/382 |
| 2017/0145562 | A1 * | 5/2017 | Farquhar | B01D 1/00 |
| 2018/0230590 | A1 * | 8/2018 | Farquhar | C22C 1/08 |
| 2021/0148648 | A1 * | 5/2021 | Liu | F28F 21/02 |

FOREIGN PATENT DOCUMENTS

| | | |
|---|---|---|
| CN | 107687677 | 2/2018 |
| JP | H02251226 | 10/1990 |

\* cited by examiner

AIR PURIFICATION PIECE AND AIR PURIFICATION MODULE

FIELD

The present disclosure relates to the field of air purification, and more particularly to an air-purifying piece and an air-purifying assembly.

BACKGROUND

With the increase in the number of new buildings, more and more new decoration materials and chemical products are used in the interior decoration, which release excessive pollutants like volatile organic compounds (VOCs) and formaldehyde, resulting in serious indoor pollution.

VOCs and formaldehyde may cause sensory irritation to the human body, such as causing the human body to feel dry, irritating eye mucous membranes, nasal mucosa, respiratory tract and skin; as well as cause discomforts like headaches, fatigue, sleepiness, etc. Pollutants such as alcohols, aromatic hydrocarbons and aldehydes will irritate the mucous membranes and upper respiratory tract; and some VOCs like benzene, tetrachloroethylene, trichloroethane, trichloroethylene and formaldehyde are carcinogens and teratogens. Therefore, indoor pollutants make people uncomfortable, significantly affect people's health, and affect people's work efficiency. Moreover, as people spend more than 80% of their lives living indoors, it is especially necessary to choose an appropriate indoor purifying method to purify and eliminate these indoor pollutants including the VOCs and formaldehyde.

Traditional adsorbent materials for purifying indoor air are widely used in the market due to their low cost and without harmful by-products. However, the conventional adsorbent materials need to be frequently replaced in actual use due to their limited adsorption capacity and short service life, thereby limiting the application of conventional adsorption purifiers.

Therefore, the existing indoor air purification techniques still need to be improved.

SUMMARY

Embodiments of the present disclosure seek to solve at least one of the problems existing in the related art to at least some extent. The present disclosure is completed based on the following discoveries and understandings of the inventors.

Adsorbent materials of conventional adsorption purifiers have short service life and low adsorption capacity. Desorption can restore the performances of the materials and solve the problem of short service life of the adsorbent materials. During the research, the inventors found that the existing desorption techniques mostly use heated air to purge adsorbent particles to achieve desorption thereof. The shortcomings of this method are as follows: 1. Due to the larger particle diameter of the adsorbent material, in the purification and regeneration processes, mass transfer resistance within the particles is large, the diffusion rate of the VOCs and formaldehyde through the particles is slow, and thus the purification and regeneration rates are slow. 2. Using hot air to purge the adsorbent particles requires continuous heating of the air, resulting in larger energy consumption. 3. An adsorbent assembly mostly uses a particle-stacked filter cartridge or adheres the adsorbent material to fiber cloth for adsorption, such adsorbent assembly, however, has large air resistance, causing large energy consumption. With respect to these problems, the inventors conducted in-depth research and proposed an indoor air-purifying technology that combines in-situ heating regeneration with indoor purification. This technology has high air-purifying efficiency, low energy consumption, and long service life. In view of this, an object of the present disclosure is to provide an air-purifying piece and an air-purifying assembly which are simple in structure and convenient to manufacture, and achieve rapid regeneration of the purifying material by performing rapid and uniform in-situ electric heating when the purifying performance is lowered, thereby prolonging the service life of the purifying material and realizing long-term and effective purification of indoor gaseous pollutants.

In a first aspect, embodiments of the present disclosure provide an air-purifying piece. According to embodiments of the present disclosure, the air-purifying piece includes: a substrate sheet; and a purifying coating disposed on an outer surface of the substrate sheet. The substrate sheet includes: a first support sheet; a second support sheet; and a heating component, disposed between the first support sheet and the second support sheet. The inventors found that the structure with the heating component disposed in the air-purifying piece is simple and convenient to manufacture. Through rapid and uniform in-situ electric heating when the purifying performance is lowered, the rapid regeneration of the purifying material is achieved, thereby prolonging the service life of the purifying material and realizing long-term and effective purification of the indoor gaseous pollutants. Moreover, the laminar structure design may effectively reduce the air resistance of the air-purifying piece and the energy consumption of a fan.

Further, the air-purifying piece according to above embodiments of the present disclosure may further have the following additional technical features.

According to embodiments of the present disclosure, the substrate sheet further includes: a first heat sink, disposed at a side of the first support sheet away from the heating component; and a second heat sink, disposed at a side of the second support sheet away from the heating component. Therefore, the heat conduction is ensured to be more uniform, and rapid and uniform heat conduction is realized.

According to embodiments of the present disclosure, the first support sheet and the second support sheet are each independently made of a metal or polyimide, thereby achieving good support effect, high temperature resistance, and good heat conduction.

According to embodiments of the present disclosure, the first support sheet and the second support sheet each independently have a thickness of 0.5 to 2 mm. Therefore, the support sheets have a thinner thickness, which ensures not only the better support effect, but also the good heat conduction.

According to embodiments of the present disclosure, the heating component is a heating wire or a heating sheet. Therefore, the heating component has good and uniform heat conduction.

According to embodiments of the present disclosure, the heating component includes at least one selected from a carbon fiber heating wire, a nickel-chromium heating wire and a mica heating sheet. Therefore, the electrothermal conversion efficiency is high, and the service life is long.

According to embodiments of the present disclosure, the heating wire is arranged in a serpentine shape. Therefore, the structure is simple and easy to implement, heat generation is uniform, and the heat conduction efficiency is high.

According to embodiments of the present disclosure, a distance between two adjacent segments of the heating wire is in a range of 1 to 10 mm. In this way, good uniformity of the heat generation is achieved, short-circuit is effectively prevented, and the heat conduction efficiency is high.

According to embodiments of the present disclosure, the purifying coating is made of at least one selected from an adsorbent material and a catalytic material. Therefore, the purifying efficiency is high, the air can be purified well and quickly, and the regeneration performance is excellent.

According to embodiments of the present disclosure, a thickness of the purifying coating is 0.5 to 2 mm. Therefore, the cost is low, the internal diffusion resistance is small, the air can be purified well, quickly, and efficiently, and the regeneration performance is excellent.

According to embodiments of the present disclosure, the first heat sink and the second heat sink are graphene heat sinks. Therefore, the heat conduction speed is high, and using these heat sinks may achieve uniform distribution of the temperature of the air-purifying piece in a desorption process, and improve the regeneration efficiency.

According to embodiments of the present disclosure, the first heat sink and the second heat sink each independently have a thickness of 0.01 to 0.1 mm. Therefore, the heat conduction speed is high, and using these heat sinks may achieve a rapid rise of the temperature of the purifying coating in a regeneration process and improve the regeneration efficiency.

In a second aspect, embodiments of the present disclosure provide air-purifying assembly. According to embodiments of the present disclosure, the air-purifying assembly includes the air-purifying piece as described above. Therefore, the air-purifying assembly has a simple structure, is easy to implement and convenient to operate, as well as is safe, stable, energy-saving and effective. When the purifying performance decreases, the indoor pollutants adsorbed in the purifying coating are discharged or catalytically oxidized by rapid and uniform in-situ electric heating to quickly realize the in-situ regeneration of the air-purifying material, thereby effectively prolonging the service life of the purifying materials, realizing the circulation application of the adsorbent materials, and further realizing long-term, rapid and effective purification of indoor gaseous organic pollutants such as VOCs and formaldehyde. Moreover, the air resistance is greatly reduced, and the energy consumption of the fan is effectively reduced.

Further, the air-purifying assembly according to the above embodiments of the present disclosure may further have the following additional technical features.

According to embodiments of the present disclosure, the air-purifying assembly includes: a support air duct, defining an air-purifying chamber having an air inlet and an air outlet; and a group of air-purifying pieces, disposed in the air-purifying chamber, and comprising at least one air-purifying piece as described above. Therefore, the air-purifying assembly is simple in structure and convenient to manufacture. The laminar structure design may effectively reduce the air resistance of the air-purifying assembly and the energy consumption of a fan. Moreover, when the purifying performance is lowered, the rapid regeneration of the purifying material is achieved by performing rapid and uniform in-situ electric heating, thereby prolonging the service life of the purifying material and realizing the long-term and effective purification of the indoor gaseous pollutants.

According to embodiments of the present disclosure, the air-purifying piece is disposed in parallel to a windward direction. Therefore, the structure is simple and easy to implement, the air resistance of the air-purifying assembly and the energy consumption of the fan are effectively reduced, and the energy is saved.

According to embodiments of the present disclosure, a distance between two adjacent air-purifying pieces is 1 to 5 mm. Therefore, the air-purifying efficiency is high, and pollutants like VOCs and formaldehyde are effectively purified.

According to embodiments of the present disclosure, the air-purifying assembly further includes at least one selected from: a volatile organic compound (VOC) sensor, disposed near the air outlet; a temperature protecting device, disposed on the support air duct; and a power supply, connected to the heating component of the air-purifying piece, the VOC sensor and the temperature protecting device respectively. Therefore, pollutants like the VOCs and formaldehyde are effectively purified, a high air-purifying rate is ensured, and the power supply is automatically disconnected when the temperature is overhigh so as to maintain the temperature of the air-purifying assembly to be stable during the regeneration process, thereby achieving the better regeneration effect and good usability.

DETAILED DESCRIPTION

Embodiments of the present disclosure will be described in detail below. The embodiments described below are illustrative, and used to generally understand the present disclosure, and thus shall not be construed to limit the present disclosure. Embodiments where specific techniques or conditions are not indicated are carried out in accordance with either the techniques or conditions described in literatures in the related art or the product specifications. Reagents or instruments whose manufacturers are not indicated are conventional products which are commercially available.

Figure 1:
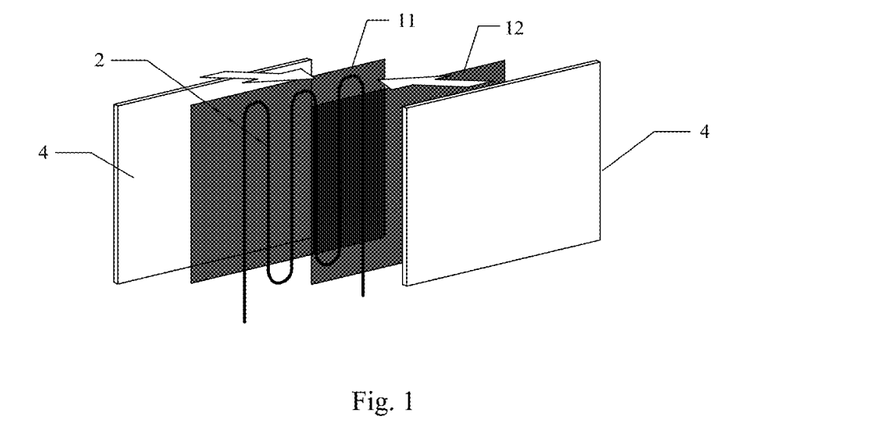
FIG. 1 is a schematic diagram of an air-purifying piece according to an embodiment of the present disclosure.

In a first aspect, embodiments of the present disclosure provide an air-purifying piece, referring to FIG. 1. According to embodiments of the present disclosure, the air-purifying piece includes a substrate sheet; and a purifying coating 4. The purifying coating 4 is disposed on an outer surface of the substrate sheet. The substrate sheet includes a first support sheet 11; a second support sheet 12; and a heating component 2. The heating component 2 is disposed between the first support sheet 11 and the second support sheet 12. The inventors found that the structure with the heating component disposed in the air-purifying piece is simple and convenient to manufacture. Through rapid and uniform in-situ electric heating when the purifying performance is lowered, the rapid regeneration of the purifying material is achieved, thereby prolonging the service life of the purifying material and realizing long-term and effective purification of the indoor gaseous pollutants. Moreover, the laminar structure design may effectively reduce the air resistance of the air-purifying piece and the energy consumption of a fan.

According to embodiments of the present disclosure, materials for forming the first support sheet and the second support sheet of the substrate sheet are not particularly limited, and can be flexibly selected by those skilled in the art as long as the needs are met. In some embodiments of the present disclosure, the first support sheet and the second support sheet each may be independently made of a metal or polyimide, thereby achieving good support effect, high temperature resistance, and good heat conduction.

According to embodiments of the present disclosure, thicknesses of the first support sheet and the second support sheet are not particularly limited, and can be flexibly selected by those skilled in the art as long as the structural supporting function can be ensured. In some embodiments of the present disclosure, the first support sheet and the second support sheet each independently have a thickness of 0.5 to 2 mm. Therefore, the first support sheet and the second support sheet are thin enough, which ensures not only the better support effect, but also the rapid and uniform heat conduction. It will be understood that, if the support sheets are too thin, both the support effect and usability are poor; if the support sheets are too thick, the heat conduction is poor, and the rapid heat conduction cannot be achieved.

Figure 2:
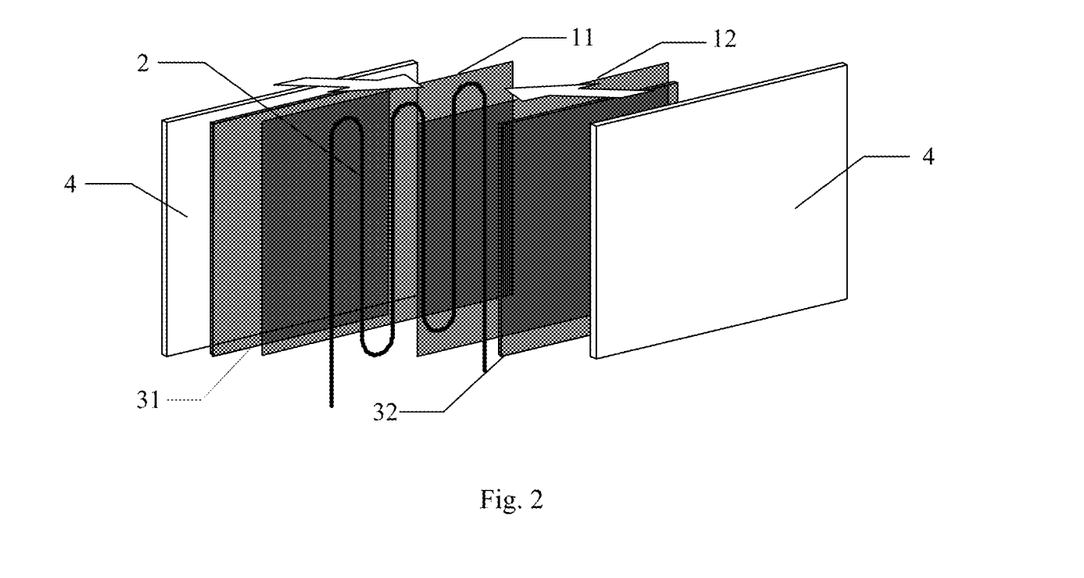
FIG. 2 is a schematic diagram of an air-purifying piece according to another embodiment of the present disclosure.

According to embodiments of the present disclosure, in order to guarantee good heat dissipation and uniform heat conduction of the air-purifying piece during the use, referring to FIG. 2, the substrate sheet further includes: a first heat sink 31 disposed at a side of the first support sheet 11 away from the heating component 2; and a second heat sink 32 disposed at a side of the second support sheet 22 away from the heating component 2. Therefore, the heat conduction is ensured to be more uniform, and the rapid and uniform heat conduction is realized.

According to embodiments of the present disclosure, materials for forming the first heat sink and the second heat sink are not particularly limited, and can be flexibly selected by those skilled in the art as long as the heat dissipation requirements are met. For example, the first heat sink and the second heat sink each include, but are not limited to, a metal heat sink, a heat pipe sink, a graphene heat sink, etc. In some embodiments of the present disclosure, the first heat sink and the second heat sink are graphene heat sinks. Therefore, both the heat dissipation efficiency and the heat conduction speed are high, and use of these heat sinks in a regeneration process may achieve rapid rise of the temperature of the purifying coating, thereby improving the regeneration efficiency.

According to embodiments of the present disclosure, thicknesses of the first heat sink and the second heat sink are not particularly limited, and can be flexibly selected by those skilled in the art as long as the heat dissipation conditions are met. In some embodiments of the present disclosure, the first heat sink and the second heat sink each independently have a thickness of 0.01 to 0.1 mm. Therefore, both the heat dissipation efficiency and the heat conduction speed are high, and the use of these heat sinks in the regeneration process may achieve a rapid rise of the temperature of the purifying coating, thereby improving the regeneration efficiency.

According to embodiments of the present disclosure, the form of the heating component is not particularly limited and can be flexibly selected by those skilled in the art as long as the heating requirement is met, for example including, but not limited to, a spiral heating component, a squirrel cage heating component, a heating wire, and the like. In some embodiments of the present disclosure, the heating component is a heating wire or a heating sheet. In this way, the heat conduction is good and uniform.

According to embodiments of the present disclosure, materials for forming the heating component are not particularly limited and can be flexibly selected by those skilled in the art as long as the heating requirement is met. For example, the heating component includes, but is not limited to, an iron-chromium-aluminum heating wire, a carbon fiber heating wire, a nickel-chromium heating wire, a mica heating sheet, and the like. In some embodiments of the present disclosure, the heating component includes at least one selected from the carbon fiber heating wire, the nickel-chromium heating wire and the mica heating sheet. Therefore, the electrothermal conversion efficiency is high and the service life is long.

According to embodiments of the present disclosure, the arrangement of the heating wire is not particularly limited, and can be flexibly selected by those skilled in the art as needed. In some embodiments of the present disclosure, the heating wire is arranged in a serpentine shape. Therefore, the structure is simple and easy to implement, heat generation is uniform, and the heat conduction efficiency is high.

According to embodiments of the present disclosure, a distance between two adjacent segments of the heating wire is not particularly limited, and can be flexibly selected by those skilled in the art as long as requirements are met. In some embodiments of the present disclosure, the distance between two adjacent segments of the heating wire is in a range of 1 to 10 mm. In this way, good uniformity of the heat generation is achieved, short-circuit is effectively prevented, and the heat conduction efficiency is high. It will be understood that, when the distance between two adjacent segments of the heating wire is less than 1 mm, the short circuit are prone to occur, and thus the heat transfer performance is not good; when the distance between two adjacent segments of the heating wire is greater than 10 mm, the uniformity of the heat generation is poor, and the heat conduction efficiency is low.

According to embodiments of the present disclosure, a material for forming the purifying coating includes at least one selected from an adsorbent material and a catalytic material. Therefore, the purifying efficiency is high, the air can be purified well and quickly, and the regeneration performance is excellent.

According to embodiments of the present disclosure, the types of the adsorbent material and the catalytic material are not particularly limited and can be flexibly selected by those skilled in the art as needed. For example, the adsorbent material includes, but is not limited to, zeolite, activated carbon, molecular sieve, silica gel, etc.; and the catalytic material includes, but is not limited to, titanium dioxide, zinc oxide, Pt-based catalysts, and the like. Using one or more of such adsorbent materials or catalytic materials or alternatively one or more of such adsorbent materials and catalytic materials as the purifying coating may achieve good and rapid air purification, small internal diffusion resistance, and excellent regeneration and usability performances.

According to embodiments of the present disclosure, a thickness of the purifying coating is in the range of 0.5 to 2 mm. If the purifying coating is too thick, the purifying efficiency will not be improved further, but resulting in the waste of the materials and increase of the costs, and the regeneration process is slow. If the purifying coating is too thin, the purifying effect is not good. Therefore, when the thickness of the purifying coating is in the range of 0.5 to 2 mm, the cost is low, the internal diffusion resistance is small, the air can be purified well, quickly, and efficiently, and the regeneration performance is excellent.

According to embodiments of the present disclosure, the manner for forming the purifying coating is not particularly limited, and can be flexibly selected by those skilled in the art as needed, for example including, but not limited to, spraying, bonding, high-temperature sintering, etc. A purifying coating material which is pulverized and dispersed to a nano-level is closely attached and fixed on the outer surface of the substrate sheet, so as to enhance the purifying performance, reduce the internal diffusion resistance of the material, and effectively increase the purifying speed of the gaseous pollutant and the regeneration speed of the purifying coating.

In a second aspect, embodiments of the present disclosure provide an air-purifying assembly. According to embodiments of the present disclosure, the air-purifying assembly includes the air-purifying piece as described hereinbefore. Therefore, the air-purifying assembly has a simple structure, is easy to implement and convenient to operate, as well as is safe, stable, energy-saving and effective. When the purifying performance decreases, the in-situ regeneration of the air-purifying material can be quickly realized by the rapid and uniform in-situ electric heating so as to realize the circulation application of the purifying material, thereby effectively prolonging the service life of the purifying materials, and further realizing long-term, rapid and effective purification of the indoor gaseous organic pollutants such as VOCs and formaldehyde. Moreover, the air resistance is greatly reduced, and the energy consumption of the fan is effectively reduced.

Figure 3:
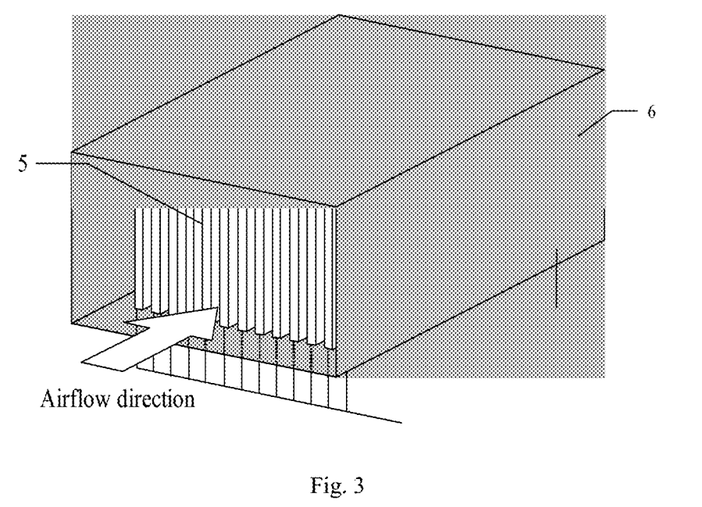
FIG. 3 is a schematic diagram of an air-purifying assembly according to an embodiment of the present disclosure.

According to embodiments of the present disclosure, in order to improve the air-purifying rate and to obtain the high quality air, referring to FIG. 3, the air-purifying assembly includes: a support air duct 6; and a group of air-purifying pieces 5. The support air duct 6 defines an air-purifying chamber, and the air-purifying chamber has an air inlet and an air outlet. The group of air-purifying pieces 5 is disposed in the air-purifying chamber, and includes at least one air-purifying piece as described hereinbefore, referring to FIG. 1 or FIG. 2. Therefore, the air-purifying assembly has a simple structure and is easy to implement. When the purifying performance decreases, the rapid regeneration of the air-purifying material can be realized by the rapid and uniform in-situ electric heating, thereby prolonging the service life of the purifying material, and achieving the long-term and effective purification of the indoor gaseous pollutants. Moreover, the laminar structure design may effectively reduce the air resistance of the air-purifying assembly and the energy consumption of the fan.

According to embodiments of the present disclosure, a windward area and a length of the support air duct are not particularly limited, and can be flexibly selected by those skilled in the art as needed. In some embodiments of the present disclosure, the windward area of the support air duct is 200 mm×300 mm, and the length of the support air duct is 300 mm. Therefore, the support air duct has a simple structure and is easy to implement. Further, the support air duct having the above-described volume is capable of accommodating an appropriate number of the air-purifying pieces, and thus the air can be purified quickly and effectively.

According to embodiments of the present disclosure, the air-purifying piece is disposed parallel to a windward direction. Specifically, it means that a wind direction (i.e., an airflow direction) is parallel to a surface of the air-purifying piece having a larger area. As a result, the structure is simple and easy to implement, the air resistance of the air-purifying assembly and the energy consumption of the fan are effectively reduced, thereby saving energy.

According to embodiments of the present disclosure, a distance between two adjacent air-purifying pieces is not particularly limited, and can be flexibly selected by those skilled in the art as needed. In some embodiments of the present disclosure, the distance between two adjacent air-purifying pieces is 1 to 5 mm. Therefore, the air-purifying efficiency is high, and pollutants such as VOCs and formaldehyde are effectively purified.

Figure 4:
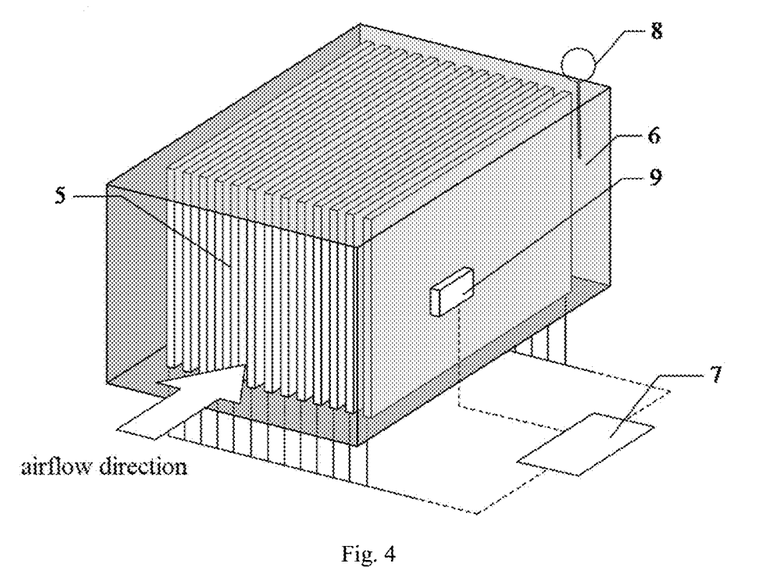
FIG. 4 is a schematic diagram of an air-purifying assembly according to another embodiment of the present disclosure.

According to embodiments of the present disclosure, in order to prolong the service life of the air-purifying piece and improve the air-purifying efficiency, referring to FIG. 4, the air-purifying assembly further includes at least one selected from: a VOC sensor disposed near the air outlet; a temperature protecting device 9 disposed on the support air duct; and a power supply 7, connected to the heating component of the air-purifying piece, the VOC sensor and the temperature protecting device respectively. Therefore, a concentration of the VOCs at the outlet is monitored, the purifying rate of the pollutants like the VOCs and formaldehyde is ensured to be high, the power supply is automatically disconnected when the temperature is overhigh, and the temperature of the air-purifying assembly is maintained to be stable during the regeneration process, thereby achieving better regeneration effect and good usability.

It should be noted that the air-purifying assembly may or may not include the power supply. When the air-purifying assembly includes the power supply, the power supply may be a built-in power supply disposed in the air-purifying assembly. When the air-purifying assembly does not include a power supply, an external power supply in any type which meets the power supplying requirements needs to be provided to supply power to the air-purifying assembly when used. According to embodiments of the present disclosure, the type of the power supply is not particularly limited and can be flexibly selected by those skilled in the art as long as the power supplying requirement is met, for example, any power supply suitable for heating is feasible.

According to embodiments of the present disclosure, conventional air-purifying systems have low purifying efficiency and short service life. In the existing desorption techniques, it is necessary to heat air and use the heated air to purge adsorbent particles, and the adsorbent particles are stacked, so the regeneration speed is slow, the air resistance is large, and the energy consumption of the system is high. However, in embodiments of the present disclosure, the heating component is used to heat the purifying coating directly, as a result, the above problems are solved, and the air-purifying efficiency is high. Moreover, when the purifying performance is lowered, the purifying coating can be regenerated by in-situ electric heating, thereby prolonging the service life of the purifying coating, and further realizing long-term and effective purification of the indoor pollutants.

According to embodiments of the present disclosure, the air purification is performed by the circulation of an indoor purification mode and an in-situ regeneration mode. Operation manners of the indoor purification mode and the in-situ regeneration mode may be manually controlled by an operator or automatically controlled through pre-stored optimization values. In some embodiments of the present disclosure, in the indoor purification mode, the heating wire 2 is powered off, and the indoor air is purified by the purifying coating 4. Throughout the purifying process, the VOC sensor 8 continuously monitors the concentration of the VOCs in the air at the outlet to reflect and ensure the air-purifying quality. When the purifying performance of the air-purifying assembly is lowered, the in-situ regeneration mode is entered. In the in-situ regeneration mode, the heating wire 2 is powered on to generate heat, which is conducted through the first support sheet 11, the second support sheet 12, the first heat sink 31 and the second heat sink 32 to uniformly heat the purifying coating 4, and the gaseous pollutants adsorbed on the purifying coating 4 are removed from the purifying coating 4 by thermal desorption or thermal catalysis or a combination thereof to achieve the in-situ regeneration of the material. The power supply 7 controls the surface temperature of each of the group of the air-purifying pieces 5 by adjusting a voltage and a heating time and maintains the temperature constant during the regeneration. In some specific embodiments of the present disclosure, the voltage of the power supply 7 is 12V AC. Therefore, the concentration of VOCs at the outlet can be monitored to ensure the effective purification of the air, the power supply is automatically disconnected when the temperature is too high, and the temperature of the air-purifying assembly is maintained to be stable during the regeneration process. As a result, the air-purifying rate is high, the pollutants like the VOCs and formaldehyde are effectively purified, and the usability is good.

EXAMPLE

Under an oncoming airflow speed of 1 m/s, a one-pass efficiency for toluene with a concentration of 1 ppm at an inlet can reach 93.5%, and air resistance is <5 Pa. The air-purifying assembly has a good purifying effect on indoor pollutants and has the low air resistance, thereby effectively reducing the energy consumption of a fan. A specific process for testing the purification-regeneration cycle of the air-purifying assembly is as follows: the concentrations of the pollutants before and after passing through the air-purifying assembly are monitored in real-time; when the one-pass efficiency of the air-purifying assembly under the air-purifying mode is reduced to 80% of the initial one-pass efficiency, the air-purifying assembly is switched to the regeneration mode, the air-purifying assembly is controlled at regeneration temperature of 80° C. for 5 min, and then cooled for 5 min; afterwards, the air-purifying assembly is switched to the air-purifying mode. After 5 purification-regeneration cycles, its one-pass efficiency for toluene can still reach 91.3%, demonstrating that the air-purifying assembly has good performance stability.

Figure 5:
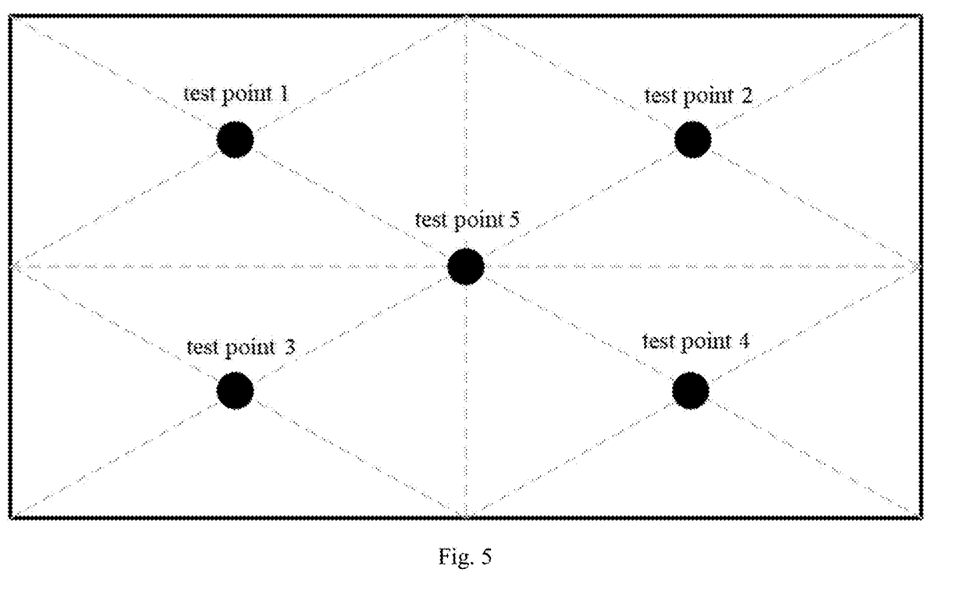
FIG. 5 is a diagram showing test points of an experiment for testing temperature uniformity of a substrate sheet according to an embodiment of the present disclosure.

The heating uniformity is tested for the regeneration process, and test points for temperature measurements are as shown in FIG. 5. Table 1 shows temperature values at respective test points when the surface temperature of the substrate sheet is controlled by the power supply at 80° C. The test results show that the heating wire can well control the surface temperature of the substrate sheet and the substrate sheet has good temperature uniformity when heated.

TABLE 1

| Temperature values at 5 respective test points (temperature unit: ° C.) | | | | |
|---|---|---|---|---|
| test point 1 | test point 2 | test point 3 | test point 4 | test point 5 |
| 80.1 | 78.2 | 78.5 | 80.5 | 82.1 |

In addition, terms such as "first" and "second" are used herein for purposes of description and are not intended to indicate or imply relative importance or significance or to imply the number of indicated technical features. Thus, the feature defined with "first" and "second" may explicitly or implicitly comprise one or more of this feature. In the description of the present disclosure, "a plurality of" means two or more than two, unless specified otherwise.

Reference throughout this specification to "an embodiment", "one embodiment", "some embodiments", "an example", "a specific example", or "some examples" means that a particular feature, structure, material, or characteristic described in connection with the embodiment or example is included in at least one embodiment or example of the present disclosure. Thus, the appearances of the phrases such as "in an embodiment", "in one embodiment", "in some embodiments", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, in absence of contradiction, those skilled in the art can combine different embodiments or examples described in this specification, or combine features of different embodiments or examples.

Although embodiments have been shown and described above, it would be appreciated by those skilled in the art that the above embodiments are explanatory and cannot be construed to limit the present disclosure, and changes, modifications, alternatives, and variations can be made in the embodiments within the scope of the present disclosure.

What is claimed is:

1. An air-purifying piece, comprising:
    a heating component, being a heating wire arranged in a serpentine shape;
    a first support sheet having a thickness of 0.5 to 2 mm, and disposed on a first surface of the heating component;
    a second support sheet having a thickness of 0.5 to 2 mm, and disposed on a second surface of the heating component opposite to the first surface;
    a first purifying coating having a thickness of 0.5 to 2 mm, and disposed on an outer surface of the first support sheet; and
    a second purifying coating having a thickness of 0.5 to 2 mm, and disposed on an outer surface of the second support sheet;
    wherein the heating component is configured to heat the first purifying coating and the second purifying coating to remove pollutants adsorbed on the first purifying coating and the second purifying coating.

2. The air-purifying piece according to claim 1, further comprising:
    a first heat sink, disposed at a side of the first support sheet away from the heating component; and
    a second heat sink, disposed at a side of the second support sheet away from the heating component.

3. The air-purifying piece according to claim 1, wherein the first support sheet and the second support sheet are each independently made of a metal or polyimide.

4. The air-purifying piece according to claim 1, wherein the heating component comprises at least one selected from a carbon fiber heating wire and a nickel-chromium heating wire.

5. The air-purifying piece according to claim 1, wherein a distance between two adjacent segments of the heating wire is in a range of 1 to 10 mm.

6. The air-purifying piece according to claim 1, wherein the first purifying coating and the second purifying coating are made of at least one selected from an adsorbent material and a catalytic material.

7. The air-purifying piece according to claim 2, wherein the first heat sink and the second heat sink are graphene heat sinks.

8. The air-purifying piece according to claim 2, wherein the first heat sink and the second heat sink each independently have a thickness of 0.01 to 0.1 mm.

9. An air-purifying assembly, comprising an air-purifying piece, wherein the air-purifying piece comprises:
   a heating component, being a heating wire arranged in a serpentine shape;
   a first support sheet having a thickness of 0.5 to 2 mm, and disposed on a first surface of the heating component;
   a second support sheet having a thickness of 0.5 to 2 mm, and disposed on a second surface of the heating component opposite to the first surface;
   a first purifying coating having a thickness of 0.5 to 2 mm, and disposed on an outer surface of the first support sheet; and
   a second purifying coating having a thickness of 0.5 to 2 mm, and disposed on an outer surface of the second support sheet;
   wherein the heating component is configured to heat the first purifying coating and the second purifying coating to remove pollutants adsorbed on the first purifying coating and the second purifying coating;
   wherein the air-purifying piece is disposed parallel to a windward direction.

10. The air-purifying assembly according to claim 9, comprising:
   a support air duct, defining an air-purifying chamber having an air inlet and an air outlet; and
   a group of air-purifying pieces, disposed in the air-purifying chamber, and comprising at least one air-purifying piece.

11. The air-purifying assembly according to claim 10, wherein a distance between two adjacent air-purifying pieces is 1 to 5 mm.

12. The air-purifying assembly according to claim 10, further comprising at least one selected from:
   a volatile organic compound sensor, disposed near the air outlet;
   a temperature protecting device, disposed on the support air duct; and
   a power supply, connected to the heating component of the air-purifying piece, the volatile organic compound sensor and the temperature protecting device respectively.

13. The air-purifying piece according to claim 4, wherein the heating wire is arranged in a serpentine shape.

14. The air-purifying assembly according to claim 9, wherein a distance between two adjacent air-purifying pieces is 1 to 5 mm.

15. The air-purifying assembly according to claim 12, wherein the volatile organic compound sensor is configured to monitor concentration of pollutants in air at the air outlet to obtain an one-pass efficiency of the air-purifying assembly, and the power supply is configured to control a temperature of a surface of the air-purifying piece by adjusting a voltage and a time;
   when the one-pass efficiency of the air-purifying assembly is lower than 80% of an initial one-pass efficiency of the air-purifying assembly, the temperature of the surface of the air-purifying piece is increased under control of the power supply.

* * * * *